United States Patent [19]
Sugino et al.

[11] 3,836,164
[45] Sept. 17, 1974

[54] COLLAPSIBLE CARRIER
[75] Inventors: Akira Sugino; Takao Ota, both of Kyoto, Japan
[73] Assignee: Nintendo Co., Ltd., Kyoto, Japan
[22] Filed: Nov. 17, 1972
[21] Appl. No.: 307,551

[30] Foreign Application Priority Data
Dec. 23, 1971 Japan.................................. 46-2216

[52] U.S. Cl................................ 280/41 A, 280/42
[51] Int. Cl........................................... B62b 11/00
[58] Field of Search............ 280/36 B, 36 R, 37, 38, 280/42, 41 D, 41 A, 41 B; 297/45

[56] References Cited
UNITED STATES PATENTS
2,722,972 11/1955 Altruda................................. 280/42
2,756,064 7/1956 Rutledge........................... 280/41 D
3,390,893 7/1968 MacLaren............................. 280/39

*Primary Examiner*—Robert R. Song
*Attorney, Agent, or Firm*—Kurt Kelman

[57] ABSTRACT

A carrier, which is collapsible by single operation without detaching any parts and all wheels of which are gathered at the lower portion of the carrier when the carrier is folded, whereby the folding can be easily effected and there is no apprehension of soiling clothes during the folding operation.

2 Claims, 16 Drawing Figures

SHEET 4 OF 6
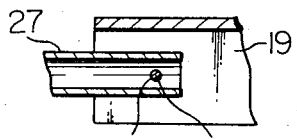
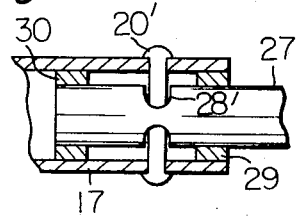
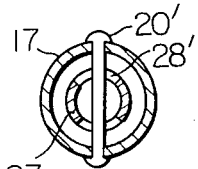
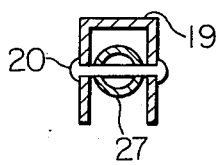
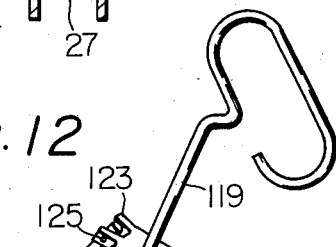
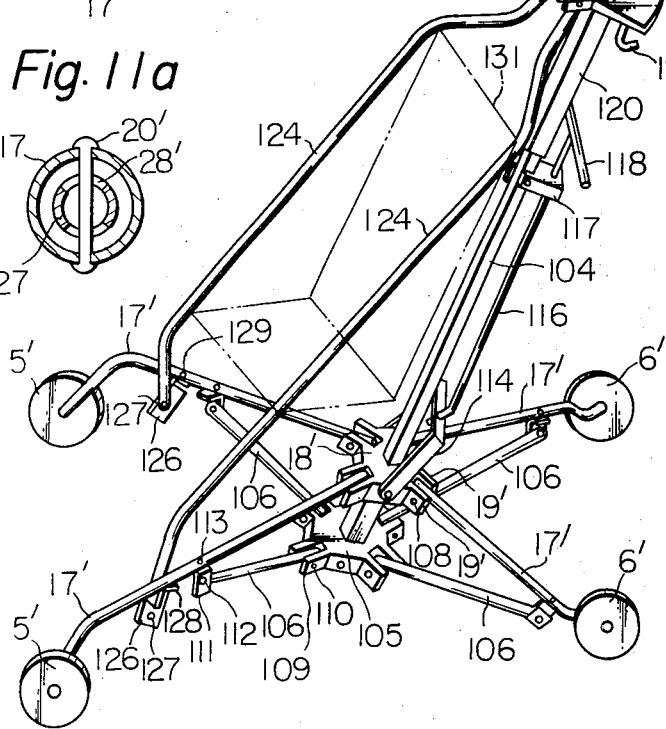

COLLAPSIBLE CARRIER

BACKGROUND OF THE INVENTION

This invention relates to a collapsible carrier which collapses into an elongated slender form occupying only a small space. More particularly, the invention relates to a collapsible carrier, which can be easily folded or opened and all wheels of which are gathered at the lower portion of the carrier when it is folded, thereby eliminating apprehension of soiling clothes and the like while it is transported in a folded state.

Various carriers which are collapsible into elongated slender forms have previously been developed. However, the majority of them require a troublesome and time-consuming folding operation. Some of the previous carriers were easily collapsed; however, in each of them, when collapsed, some of the wheels are positioned at places other than the lower portion of the carrier, so the carriers are apt to soil clothes.

For example, in the apparatus disclosed in Japanese Utility Model Publication No. 24216/26, a plurality of collapsible lever means need to be folded after latch means for arresting the sliding action between main poles and upright poles are released for folding said apparatus. In the apparatus disclosed in Japanese Utility Model Publication No. 13549/70, the folding of said apparatus can be easily achieved by folding a collapsible lever means extending between two main poles. However, during the folding operation, the main poles are folded in two and a pair of wheels are moved to an upper portion of the apparatus, where it is apt to soil clothes and the like.

SUMMARY OF THE INVENTION

An object of the invention is to provide a carrier, which can be collapsed with all the wheels gathered at the lower portion of the collapsed assembly, and which occupies a very small space when it is collapsed; furthermore, the operation for folding said carrier being simple and not time-consuming.

In the collapsible carrier according to this invention, a joint member is used as a means for folding the carrier. The joint member is arranged to be movable vertically. Folding levers pivotally connected to the joint member are bundled by the upward movement of the joint member and extend radially to go away from the others upon downward movement of the joint. For the joint member, a rod passing therethrough may be provided and the joint member may be guided for vertical movement on the rod. Wheels may be rotatably mounted on the outer ends of the respective folding levers extending radially from the joint member, or they may be rotatably mounted on the lower ends of props pivotally connected to the respective folding levers. Thus, in the collapsible carrier according to this invention, the folding can be achieved by only moving the joint member upwardly, and all the wheels are gathered at the lower portion of the carrier when it is collapsed.

BRIEF DESCRIPTION OF THE DRAWINGS

FIGS. 10 and 10a are sectional illustrations showing the pivoting mechanism between the folding levers and a joint member;

FIGS. 11 and 11a are sectional illustrations showing the mechanism for effecting the relative rotation between the folding levers and inner rods;

FIG. 12 is a perspective view of a carrier which is another embodiment of this invention;

DESCRIPTION OF PREFERRED EMBODIMENT

Figure 1:
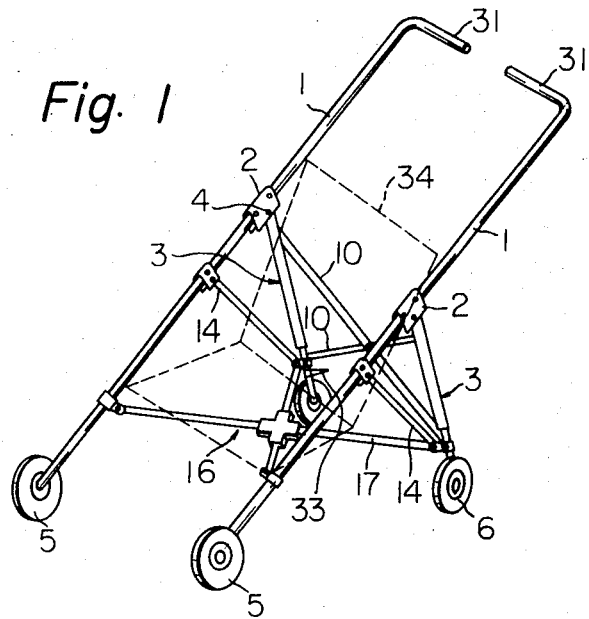
FIG. 1 is a perspective view of a carrier which is one embodiment of this invention.
Figure 2:
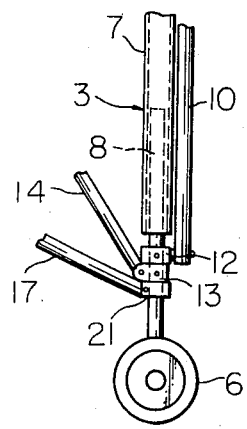
FIG. 2 is a side elevational view of the lower portion of one of sub props of the carrier illustrated in FIG. 1.
Figure 3:
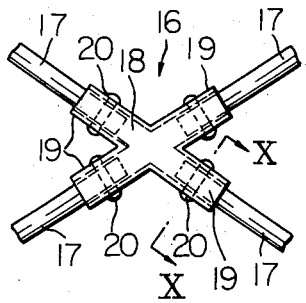
FIG. 3 is a plan view of the mid-portion of the X-shaped floor assembly of the carrier illustrated in FIG. 1.
Figure 4:
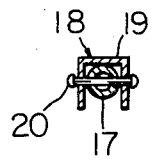
FIG. 4 is a sectional illustration taken along line X—X in FIG. 3.

In FIG. 1 through FIG. 11, there is shown a carrier which is one embodiment of this invention. A pair of main props 1, which are transversely spaced from each other, are inclined rearwardly. Joint lug 2 is secured to each prop 1 at the mid-portion thereof and sub-prop 3 is pivotally connected to said joint lug at the upper end thereof by pin 4. The upper ends of main props 1 are bent to form handle portions and foot rest 32 (FIG. 7) is provided between the lower portions of main props 1. Each sub-prop 3 is provided with a rear wheel 6 adapted to rotate at the lower end thereof.

Sub-props 3 are adapted to freely extend and retract utilizing the construction in which inner tubes 8 are telescoped into outer tubes 7. The respective upper ends of two rear stays 10, which are pivotally connected to each others at the center thereof by pin 9, are pivotally connected to one portions of L-shaped members 11, and other portions of said members 11 are secured or pivotally connected to the upper end portions of outer tubes 7, respectively. The respective lower ends of rear stays 10 are pivotally connected to one portion of second L-shaped members 12, and other portions of said members 12 are secured or pivotally connected to the lower end portions of inner tubes 8, respectively. Consequently, the distance between the upper ends of rear stays 10 (and, of course, also the distance between the lower ends of the same) is adjustable.

Each inner tube 8 is provided with member 13 having tubular portion which is press fitted thereto. Subsidiary lever 14 is pivotally connected to said member 13 at the lower end thereof, and to metal fitting 15 secured to main prop 1 at the upper end thereof. One of the inner tubes is provided with push plate 33.

X-shaped floor assembly 16 comprises folding levers 17 which are disposed in X like disposition and joint member 18, said folding levers being adapted to swing vertically about joint member 18 by pivotally connecting the inner ends thereof to respective projections 19 of joint member 18 by pins 20, and outer ends of said levers being pivotally joined to the lower portions of main and sub-props.

Figure 5:
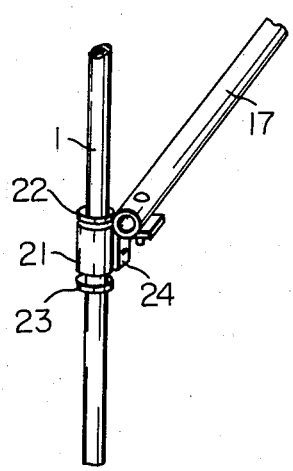
FIG. 5 is a perspective illustration showing a construction of a pivoting joint between a folding lever and a prop of the carrier shown in FIG. 1.

For pivotally connecting the folding levers to the props, as shown in FIG. 5, tubular elements 21 are provided on the respective props and collars 23 are secured to the props for preventing tubular elements 21 from moving vertically but permitting the rotation thereof about the props, said tubular elements 21 being provided with L-shaped members 24 pivotally mounted thereon and L-shaped members 24 being in turn connected to the folding levers, thereby absorbing the torsion of levers 17 which is caused by folding operation of the carrier.

Figure 8:
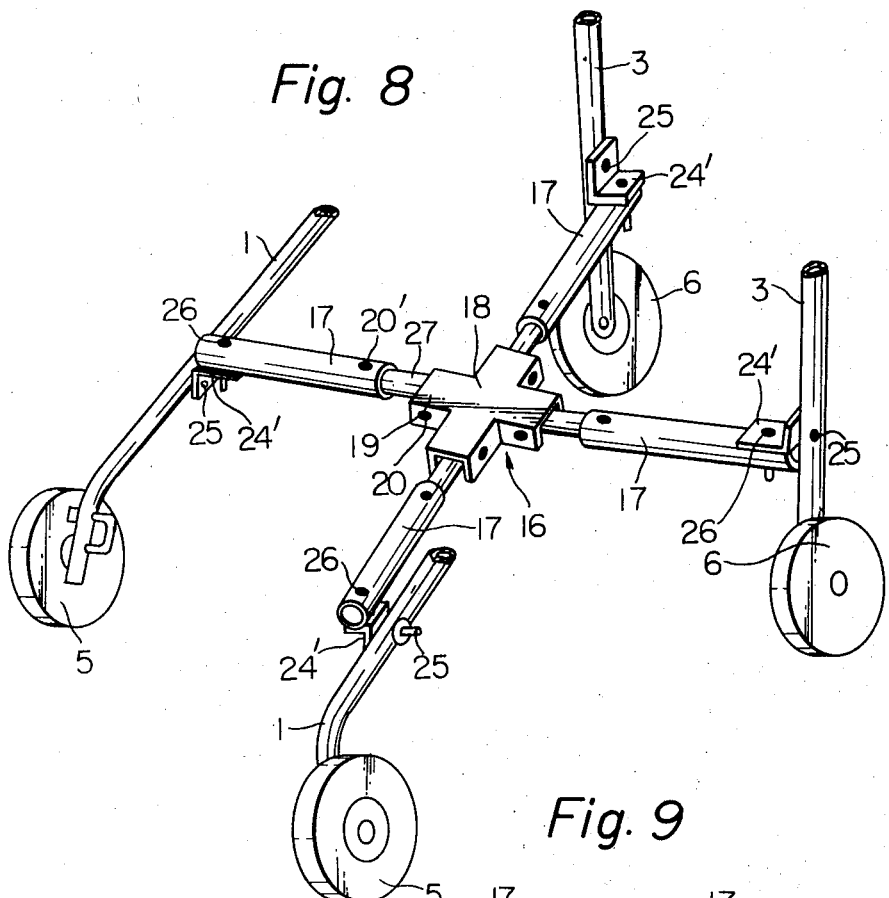
FIG. 8 is a perspective illustration showing a modification of the X-shaped floor assembly.
Figure 9:
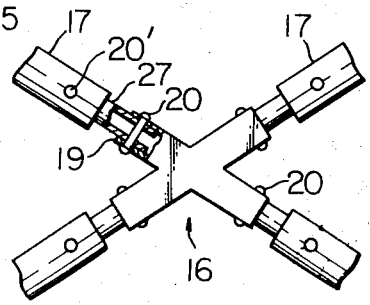
FIG. 9 is a partially sectional illustration showing the mid-portion of the X-shaped floor assembly shown in FIG. 8.

In the embodiment illustrated in FIG. 8, the torsion of the folding levers caused by folding operation of the carrier is absorbed by employing the construction in which L-shaped members 24' are pivotally connected to props 1 and 3 by pins 25 to permit the swinging thereof in vertical planes and folding levers 17 are pivotally connected to said members 24' so as to permit swinging in horizontal planes, and respective inner rods 27 are inserted in the respective inner ends of folding levers 17 so as to be permitted to rotate with respect to levers 17 within a limited angle. As shown in FIGS. 9 through 11a, each inner rod 27 is provided with a vertical elongated slot 28', through which pin 20' vertically mounted on folding lever 17 passes, thereby permitting the rotation of inner rod 27 within the limited angle defined by elongated slot 28'. Inner rod 27 is inserted into channel shaped projection 19 of the joint member, said projection having an inverse U-shaped sectional configuration, and pin 20 horizontally mounted on projection 19 passes through horizontal slot 28 provided in inner rod 27, whereby inner rod 27 can swing with respect to projection 19 about pin 20. For the reason that the folding levers (which are tubular elements in this embodiment) and the inner rods are made of aluminum, rings made of synthetic resin 29 and 30 are secured to folding levers 17 and inner rods 27, respectively, for smooth rotation of inner rods 27.

While it is preferred that seat 34 be made of cloth and arranged to be folded at the time the frame of the carrier is folded, a rigid basket like seat which is detachable from the frame is acceptable. When the carrier is used as something other than a baby buggy, such as a carriage for shopping or transporting goods, both a bag for shopping which is made of cloth and arranged to be folded and a rigid basket detachable from the frame are acceptable.

When the carrier is used as a baby buggy, X-shaped floor assembly must be spread flat as shown in FIG. 1. The spread state of the floor assembly (accordingly, also that of the frame) is ensured by the construction in which joint member 18 is prevented from further moving downwardly as it reaches the position just below the plane which includes the pivotal joints between floor levers and the props.

Figure 6:
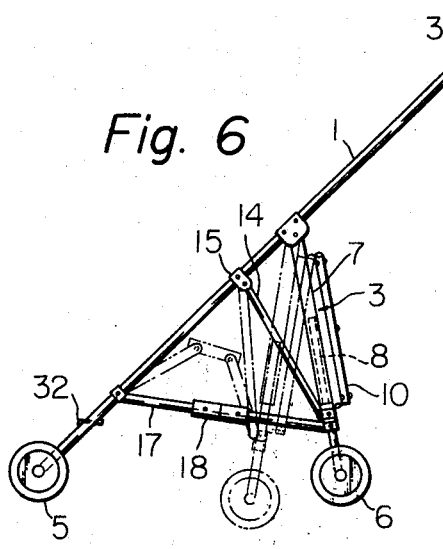
FIG. 6 is a side elevational view of the carrier of FIG. 1 showing the folding action of elements therein.

The folding of the carrier is achieved by only pushing joint member 18 upwardly. As shown in FIG. 6, sub-props 3 approach the main props with increasing in length, and at the same time, the distance between the upper ends of rear stays 10 (of course also the distance between the lower ends of the same) decreases and the carrier becomes narrower.

Figure 7:
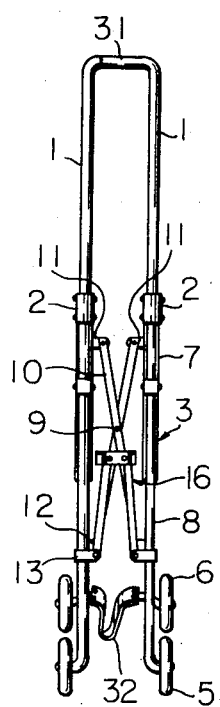
FIG. 7 is a plan view of the carrier shown in FIG. 1 showing the carrier in folded condition.

As joint member is moved further upward, each of four levers 17 approaches the others and finally reaches a vertical state, at which time props 1 and 3 are gathered and main props are in a vertical state, and consequently, the carrier is folded into a bundle-like form as shown in FIG. 7.

The operator transforms the carrier from the folded state illustrated in FIG. 7 to the state for use illustrated in FIG. 1 by urging push plate 33 downwardly with one foot while pulling handles 31 backward.

Subsidiary levers 14 do not have any effect on the above mentioned operation for folding and opening the carrier, therefore they may be eliminated from the carrier. Joint lugs 2 may be eliminated if sub-props are directly connected to main props. Rear stays 10 can also be omitted since the lateral expansion of the carrier is restricted by foot rest 32 made of flexible material such as cloth. Subsidiary levers 14, joint lugs 2 and rear stays 10 are elements for reinforcing the carrier, and are not essential for the folding operation.

If props 1 and 3 are adapted to grip a rigid basket, the basket can be supported even if X-shaped floor assembly is omitted. However, said assembly is essential for gathering the four props, namely main props 1 and sub-props 3, into a single bundle unit by only one operation.

It is not necessary that the four folding levers 17 of X-shaped floor assembly be of uniform length. The pair of rear folding levers may be made shorter than the front ones. It is also not necessary that the distance between the outer ends of the rear folding levers be equal to that of the front ones. The former may be made shorter than the latter. In other words, the four folding levers need not be disposed precisely in an X, and furthermore, the joint member need not be disposed at the center of the floor assembly. The floor assembly may function if a pair of levers extend in oblique rearward directions from the joint member and another pair of levers extend in oblique forward directions from the same. It is not necessary to specify the direction in which the folding levers extend and the length of said levers.

Figure 13:
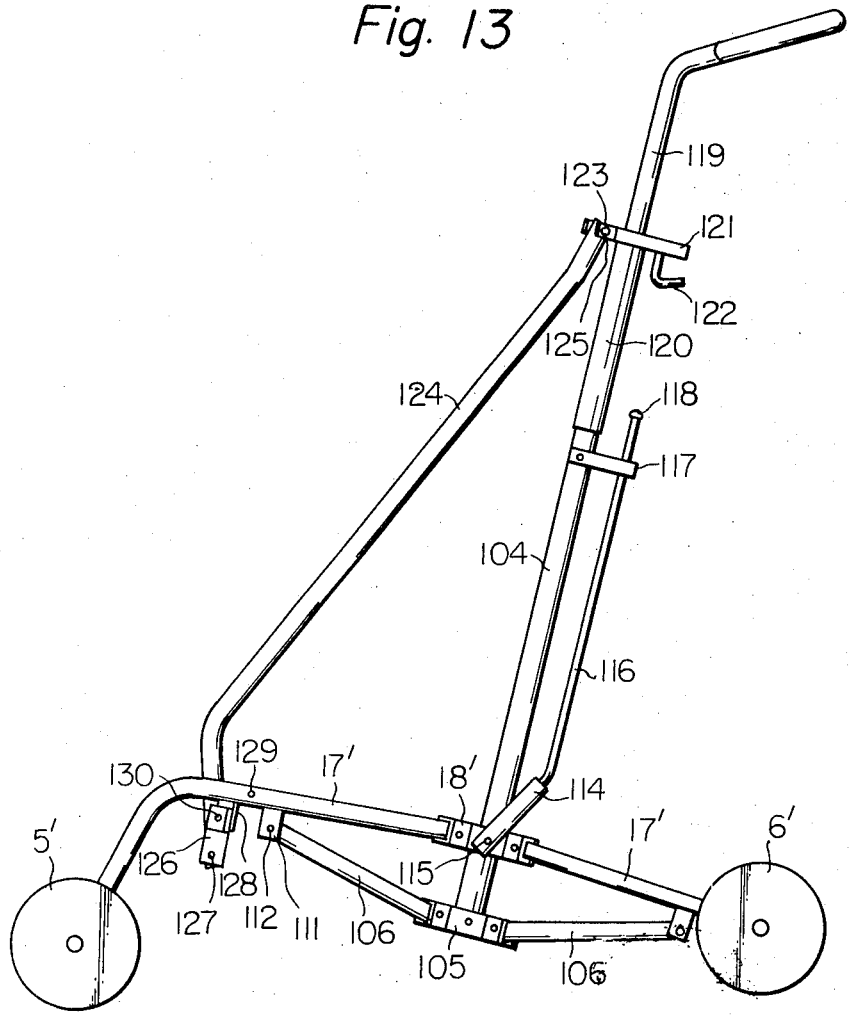
FIG. 13 is a side elevational view of the carrier shown in FIG. 12.
Figure 14:
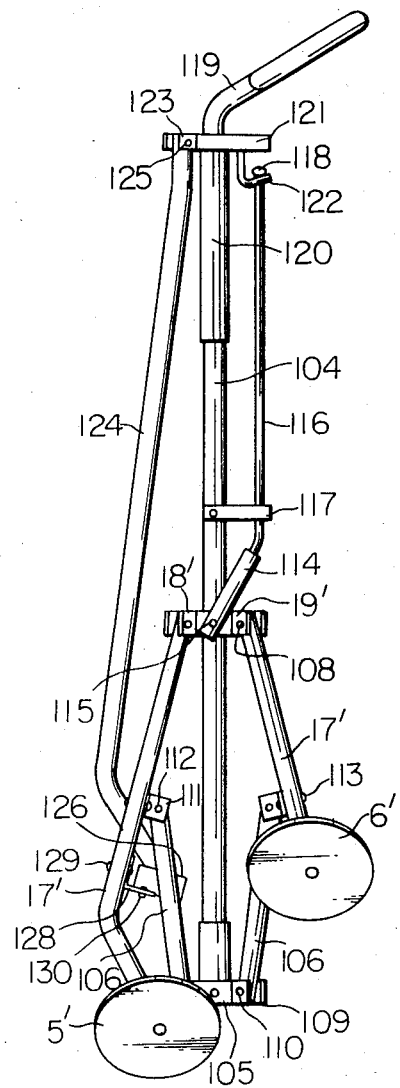
FIG. 14 is a side elevational view of the carrier illustrated in FIG. 12 showing the carrier in folded condition.

FIGS. 12 through 14 show a modification of the carrier fabricated according to this invention.

In this modification, pole 104 having rectangular sectional configuration and extending vertically at the center of the carrier is provided instead of main props 1 of the afore-explained embodiment. Joint member 18' has a rectangular slot corresponding to the sectional configuration of said pole 104 at the center thereof to slidably receive pole 104.

Each of the four corners of joint member 18' is provided with a pair of projections 19', to which the inner end of folding lever 17' is pivotally connected by pin 108. Fixed joint member 105 is secured to the lower end of pole 104, each of the four corners of which is also provided with a pair of projections 109 which extend in the same direction as the pair of projections 19' corresponding thereto. Support stay 106 is pivotally connected to each pair of projections 109 at the inner end thereof by pin 110 and to the vertical portion of L-shaped member 111 at the outer end thereof by pin 112, thereby permitting the swinging thereof in a vertical plane. Each of L-shaped members 111 is pivotally connected to folding lever 17' at the horizontal portion thereof by pin 113, whereby L-shaped member can rotate in a horizontal plane with respect to lever 17'.

Joint member 18' is provided with fork 114 pivotally mounted on the side surfaces of the joint member at the leg portions thereof by pin 115. The cross portion of fork 114 loosely receives the lower portion of lever 116 and the upper surface of the end portion of lever 116 engages with the lower surface of said cross portion of fork 114. The upper portion of lever 116 passes through a slot of lug 117 secured to the upper portion of pole 104 and handle bar 118 is fixed to the upper end of the lever 118. Latch means may be provided between lug 117 and handle bar 118 or lever 116, or between joint member 18' and fixed joint member 105 for arresting the upward movement of joint member 18' is maintain the spread state of the carrier shown in FIG. 12.

Handle 119 is fixed to the upper end of pole 104. Sliding tube 120 rides on the lower portion of handle 119 and/or the upper portion of pole 104 so that the sliding tube can move vertically guided by handle 119 or pole. Support plate 121 is secured to the upper end of sliding tube 120. Support plate 121 is provided with hook 122 at the lower surface thereof, said hook being adapted to catch handle bar 118 of lever 116. Two pairs of projections 123 extend from the forward edge of support plate 121 and slanting stays 124 (which are pipes for supporting a seat) are pivotally connected to respective pairs of said projections 123 at the upper ends thereof by pins 125. The lower end of each slanting stay 124 is pivotally connected to the vertical portion of second L-shaped member 126 by pin 127, said member 126 being in turn pivotally connected to third L-shaped member 128 by pin 130, which is mounted on folding lever 17' at the horizontal portion thereof by pin 129.

Seat 131 made of cloth or synthetic resin may be mounted on slanting stays 124. When a boxlike body made of synthetic resin is utilized as a seat, it should be detachable from the carrier. It is convenient for lightening the carrier to form slanting stays 124, folding levers 17' and support stays 106 from cylindrical aluminium pipe, pole 104 from aluminium pipe having rectangular configuration and joint member 18' and fixed joint member 105 from die-cast aluminium.

The modified carrier is suitable for use as a baby buggy. When used as a baby buggy, with a baby on seat 131, the carrier can be moved in a stable manner after folding levers 17' and support stays 106 have been spread to the substantially horizontal disposition as illustrated in FIG. 13 and two pairs of wheels 5' and 6' have been moved to their outermost positions.

When it is necessary to fold the baby buggy for carrying on a vehicle or for storage, fixed joint member 105 is pressed downward by one foot of the operator and handle 118 secured to the upper end of lever 116 is pulled up by one hand to raise joint member 18'. As joint member 18' rises, the inner ends of folding levers 17' are raised, whereby folding levers 17' are successively moved to the vertical state. As folding levers 17' rise, L-shaped members 111 and the outer ends of support stays 106 are lifted. At the same time, the upper ends of slanting stays 124 are raised to lift support plate 121. As the joint member reaches the pre-fixed position, slanting stays 124, folding levers 17' and support stays 106 uprise and gather about the center of the carrier to become bundle like. The four wheels are also gathered about the center and the carrier becomes in the state illustrated in FIG. 14. Finally, handle bar 118 is fastened to hook 122 for maintaining the folded state of the carrier.

To transform the carrier from the folded state shown in FIG. 14 to the functioning state shown in FIGS. 12 and 13, handle bar 118 is released from hook 122 and depressed downward. As lever 116 descends, joint member 18' descends, and folding levers 17' incline and the four wheels go away from each other. According to the inclining of folding levers 17', support stays 106 incline. As joint member 18' reaches the pre-fixed lowest position, folding levers 17' and support stays 106 extend substantially horizontally, whereupon the carrier can securely support a baby or other objects on seat 131.

Although illustrative embodiments of the invention have been described herein with reference to the accompanying drawings, it is to be understood that the invention is not limited to these embodiments, and that various changes and modifications may be effected therein by one skilled in the art without departing from the scope or spirit of this invention.

What is claimed is:

1. A folding carrier comprising: a pair of main props which are transversely spaced from each other and provided with front wheels rotatably mounted on the lower ends thereof; a pair of sub-props which are transversely spaced from each other and pivotally connected to the mid-portion of said main props at the upper ends thereof and provided with rear wheels rotatably mounted on the lower ends thereof, said sub-props being adapted to be extensible and retractable in the respective longitudinal direction thereof; X-shaped floor assembly including four folding levers and joint member, said folding members being pivotally connected to the lower portions of said main and sub-props at the respective outer ends thereof and pivotally connected to the joint member at the respective inner ends thereof so that the joint member is allowed to move in vertical direction, whereby, by urging said joint member upwardly, said carrier can be folded into an elongated slender form with all the wheels gathered at the lower portion of the carrier.

2. A folding carrier according to claim 1, wherein said folding levers are adapted to be able to rotate with respect to the joint member about the axes thereof.

* * * * *